US008548161B2

(12) United States Patent
Murray (10) Patent No.: US 8,548,161 B2
(45) Date of Patent: Oct. 1, 2013

(54) CRYTOGRAPHICALLY TRANSFORMING DATA TEXT

(75) Inventor: Bruce Murray, Hamburg (DE)

(73) Assignee: NXP B.V., Eindhoven (NL)

( * ) Notice: Subject to any disclaimer, the term of this patent is extended or adjusted under 35 U.S.C. 154(b) by 385 days.

(21) Appl. No.: 12/965,689

(22) Filed: Dec. 10, 2010

(65) Prior Publication Data

US 2011/0311041 A1   Dec. 22, 2011

(30) Foreign Application Priority Data

Dec. 10, 2009  (EP) .................................... 09252767
Nov. 12, 2010  (EP) .................................... 10190972

(51) Int. Cl.
*H04L 9/28* (2006.01)

(52) U.S. Cl.
USPC ............................................ 380/28; 708/270

(58) Field of Classification Search
USPC ................. 380/28–30; 708/200, 208, 270
See application file for complete search history.

(56) References Cited

U.S. PATENT DOCUMENTS

| | | | | |
|---|---|---|---|---|
| 5,297,206 | A * | 3/1994 | Orton | 380/30 |
| 5,870,603 | A * | 2/1999 | Lloyd | 718/100 |
| 5,999,627 | A * | 12/1999 | Lee et al. | 380/30 |
| 6,185,596 | B1 * | 2/2001 | Hadad et al. | 708/491 |
| 6,282,290 | B1 * | 8/2001 | Powell et al. | 380/28 |
| 6,381,625 | B2 * | 4/2002 | Oberman et al. | 708/606 |
| 6,748,412 | B2 * | 6/2004 | Ruehle | 708/606 |
| 6,769,090 | B1 * | 7/2004 | Halder | 714/792 |
| 8,176,109 | B2 * | 5/2012 | Fischer | 708/490 |
| 2005/0055563 | A1 * | 3/2005 | Fischer et al. | 713/194 |
| 2006/0090062 | A1 * | 4/2006 | Vorbach et al. | 712/226 |
| 2006/0198516 | A1 * | 9/2006 | Mityagin et al. | 380/30 |
| 2007/0233769 | A1 * | 10/2007 | Moshier et al. | 708/491 |
| 2008/0270494 | A1 * | 10/2008 | Avanzi | 708/200 |
| 2009/0238360 | A1 * | 9/2009 | Ciet et al. | 380/28 |

OTHER PUBLICATIONS

Nicolas Meloni "New Point Addition Formulae for ECC Applications" [Online], Jun. 21, 2007 [Retrieved on: Feb. 9, 2013] Spring-Verlag Berlin Heidelberg, pp. 189-201 [Retrieved from: http://hal-lirmm.ccsd.cnrs.fr/docs/00/18/89/57/PDF/NewPointAddition.pdf ].*
Ciet et al. "(Virtually) Free Randomization Techniques for Elliptic Curve Cryptography" [Online], 2003 [Retrieved on Feb. 9, 2013], Spring-Verlag Berlin Heidelberg, ICICS 2003, LNCS 2836, pp. 348-359 [ Retrieved from: http://joye.site88.net/papers/CJ04eccfree.pdf ].*

(Continued)

*Primary Examiner* — April Y Blair
*Assistant Examiner* — Eric W Shepperd (57) ABSTRACT

In the field of cryptography there is a need to reduce the time taken to cryptographically transform data text while maintaining the low memory requirements associated with conventional square-and-multiply modular exponentiation.
A method of cryptographically transforming data text c comprises the step of generating an integer representation m of the data text c according to $$m = c^d$$

where
  d is a predetermined exponent.
The step of generating the integer representation m includes generating a sequence of intermediate numbers, each intermediate number being based on two or fewer earlier numbers in the sequence. Generating a sequence of intermediate numbers includes retrieving a pre-stored instruction to determine which two or fewer earlier numbers in the sequence a given intermediate number is based on and the functional manipulation of the or each earlier number required to generate the given intermediate number.

9 Claims, 7 Drawing Sheets

|  | Register 1 | | Register 2 | |
|---|---|---|---|---|
| d = | x | * $2^k$ + | y | |
| | ↓ halve | store opcode | ↓ | → R1 = 2*R1 |
| | x / 2 | | y | |
| | ↓ | store opcode | ↓ | → opcode |
| | | | | |
| | ↓ | store opcode | ↓ | → opcode |
| | a | | b | |
| | ↓ subtract | store opcode | ↓ | → R1 = R1 + R2 |
| | a - b | | b | |
| | ↓ | store opcode | ↓ | → opcode |
| | 1 | | 1 | |

(56) References Cited

OTHER PUBLICATIONS

Peter de Rooij, "Efficient exponentiation using precomputation and vector addition chains" [Online], 1994 [Retrieved on: Feb. 9, 2013], in Advances in Cryptology—Proceedings of Eurocrypt '94, vol. 658 pp. 200-207 [ Retrieved from: http://download.springer.com/static/pdf/176/chp%253A10.1007%252FBFb0053453.pdf ].*

European Search Opinion for Application No. 10190972.9 [Online] May 4, 2011 [ Retreived on: Feb. 9, 2013], www.epo.org, [Retrieved from: https://register.epo.org/espacenet/application?documentId=ERJ2DL6Y9903FI4&number=EP10190972&lng=en&npl=false ].*

R. Goundar, et al. : "SPA Resistant Scalar Multiplication Using Golden Ratio Addition Chain Method," http://www.iaeng.org/IJAM/issues_v38/issue_2/IJAM_38_2_02.pdf, (Jun. 21, 2008).

A. Byrne, et al. : "SPA Resistant Elliptic Curve Cryptosystem using Addition Chains," Int. J. High Performance Systems Architecture, vol. 1, No. 2, pp. 133-144, (2007).

R. Parker, et al. : "Addition Chains with a Bounded Number of Registers," Information Processing Letters, vol. 90, Issue 5, pp. 247-252 (Jun. 15, 2004).

* cited by examiner

CRYTOGRAPHICALLY TRANSFORMING DATA TEXT

This application claims the priority under 35 U.S.C. §119 of European patent application no. 09252767.0, filed on Dec. 10, 2009, and 10190972.9, filed on Nov. 12, 2010 the contents of which are incorporated by reference herein.

BACKGROUND OF THE INVENTION

One way in which data text may be cryptographically transformed is by modular exponentiation.

Such exponentiation involves determining the remainder when dividing a positive base integer y, which is raised to the e-th power by an exponent e, by a positive integer, i.e. a modulus z.

In other words the calculation takes the form $$x=y^e (\bmod z)$$

A modular exponentiation calculation as set out above is relatively easy to do, even if the numbers involved are very large.

However, determining the discrete logarithm, i.e. finding exponent e given the base integer y, the remainder x, and the modulus z is very difficult. This one way functionality makes modular exponentiation very useful in cryptography.

One field of cryptography in which modular exponentiation is used is public-key cryptography, such as RSA (Rivest, Shamir and Adleman) public-key cryptography.

RSA cryptography utilises modular exponentiation to cryptographically transform data text to both encrypt the data text and decrypt the data text.

RSA cryptography first involves the step of key generation which includes determination of a public key and a private key. The public key can be known to everyone and is used for encrypting messages. Messages encrypted with the public key can only be decrypted using the private key.

The public key consists of a modulus z and a public encryption exponent e. The private key consists of the modulus z and a private decryption exponent d which must be kept secret.

To encrypt a message M it is first necessary to turn M into an integer, i.e. a data text y, using an agreed-upon reversible protocol, such as a padding scheme.

A first cryptographic transformation, i.e. an encryption transformation, involves generating an integer representation x of the data text y according to $$x=y^e (\bmod z)$$

The integer representation x is an encrypted cipher text which can be transmitted to a recipient.

An intended recipient can recover the original data text y by carrying out a second cryptographic transformation, i.e. a decryption transformation, on the encrypted data text x.

The second cryptographic transformation involves generating an integer representation of the encrypted data text x using the private decryption exponent d by the following computation $$y=x^d (\bmod z)$$

Accordingly, it is possible to recover the original data text y from the encrypted data text x.

Given the further integer representation, i.e. original data text y, it is possible to recover the original message M by reversing the agreed-upon reversible protocol.

Other cryptographic-related tasks such as, for example, agreeing on a cryptographic key, constructing a digital signature, and verifying such a signature, also utilize modular exponentiation, or exponentiation within another mathematical structure, for example, the group of points on an elliptic curve.

Such tasks typically look to generate an integer representation x of an original data text y, and so employ an exponential computation similar to that in the first cryptographic transformation mentioned above, i.e.

$$x=y^e$$

In each of the aforementioned cases the exponentiation calculation, i.e. $x=y^e$, can be computed using, for example, a square-and-multiply algorithm for modular exponentiation. Such computations require the manipulation of only two elements, i.e. the preceding iteration and the integer 1. As a result only two memory elements are required.

However such a calculation requires a large number of computational operations and so takes a finite amount of time to complete.

In many instances the time taken to complete the computational operations results in a delay that is perceptible by a user.

Accordingly it is desirable to reduce the time taken to complete the computational operations required, and hence the time required to complete a cryptographic task such as encrypting data text or decrypting data text.

One way of increasing the speed with which the integer representation x is generated is to employ unconstrained iterations in the exponentiation calculation, i.e. in calculating $x=y^e$.

However such an approach requires storage of a large number of the iterations which results in the required number of memory elements being prohibitively large.

There is, therefore, a need to reduce the time taken to cryptographically transform a data text while maintaining the low memory requirements associated with conventional square-and-multiply modular exponentiation.

SUMMARY OF THE INVENTION

According to a first aspect of the invention there is provided a method of cryptographically transforming data text c comprising the step of generating an integer representation m of the data text c according to $$m=c^d$$

where
d is a predetermined exponent,
the step of generating the integer representation m including generating a sequence of intermediate numbers, each intermediate number being based on two or fewer earlier numbers in the sequence, generating a sequence of intermediate numbers including retrieving a pre-stored instruction to determine which two or fewer earlier numbers in the sequence a given intermediate number is based on and the functional manipulation of the or each earlier number required to generate the given intermediate number.

The use of a pre-stored instruction to determine which two or fewer earlier numbers in the sequence a given intermediate number is based on allows for less constrained generation of the intermediate numbers than in conventional square-and-multiply modular exponentiation, and so reduces the number of computational operations required to calculate $m=c^d$.

Such a reduction in computational operations, and hence reduction in time taken to cryptographically transform the data text c, is achieved while requiring the storage of not more than two integers (i.e. two or fewer earlier numbers in the sequence), and so maintains the low memory requirements associated with conventional square-and-multiply modular exponentiation.

Preferably generating the integer representation m further includes the step of deriving and storing a list of instructions, each instruction corresponding to the generation of a given intermediate number.

Deriving and storing a list of instructions permits tailoring of the instructions, for example, according to the nature of the exponent.

Optionally the method includes storing the list of instructions in a first, chronological sequence and retrieving the list of instructions in a second, reverse-chronological sequence.

These steps permit the instructions to start, chronologically, from, e.g. a desired exponent such that executing the instructions in a reverse-chronological order raises an integer to the desired exponent.

In an embodiment of the method of the invention, deriving and storing a list of instructions includes deriving the instructions from the predetermined exponent d.

Deriving the instructions from the predetermined exponent d means that executing the instructions in a reverse-chronological order can be used to raise an integer to the exponent, and hence generate the integer representation m from $m=c^d$.

Preferably deriving the instructions from the predetermined exponent includes:
  splitting the binary equivalent of the predetermined exponent d into first and second bit portions;
  executing a convergent sequence of operations on the first and second bit portions to reduce each bit portion to 1; and
  deriving an instruction at each step of the convergent sequence of operations.

Splitting the exponent d into first and second bit portions allows the execution of the convergent sequence of operations to utilise only two memory elements, and so be performed while maintaining the low memory requirements associated with conventional square-and-multiply modular exponentiation.

In a further embodiment of the method of the invention, executing a convergent sequence of operations on the first and second bit portions includes:
  identifying the bit portion having the larger magnitude;
  halving the larger magnitude bit portion if the larger magnitude bit portion is even; and
  subtracting the smaller magnitude bit portion from the larger magnitude bit portion if the larger magnitude bit portion is odd; and
  repeating the foregoing steps until each bit portion is 1.

Such steps derive a list of instructions which has fewer entries than the number of computational operations in conventional square-and-multiply modular exponentiation for the same exponent.

Optionally, deriving an instruction at each step of the convergent sequence of operations includes:
  deriving a double instruction when the larger magnitude bit portion is halved; and
  deriving an add instruction when the smaller magnitude bit portion is subtracted from the larger magnitude bit portion.

Deriving such instructions ensures that when executed in a reverse-chronological sequence a desired functional manipulation of the two or fewer earlier numbers in the sequence occurs.

Conveniently, deriving a double instruction includes indicating the register in which the larger magnitude bit portion resides, and deriving an add instruction includes indicating the respective memory elements in which each of the larger magnitude bit portion and the smaller magnitude bit portion resides.

Such steps ensure that the or each memory element is manipulated as desired when the instructions are executed in a reverse-chronological sequence.

In another embodiment of the method of the invention, generating a sequence of intermediate numbers further includes:
  (a) initialising first and second memory elements with the binary equivalent of the data text c;
  (b) retrieving a pre-stored instruction;
  (c) functionally manipulating one or both of the first and second memory elements according to the retrieved instruction to generate an intermediate number; and
  (d) repeating each of steps (b) and (c) for each instruction in the list of instructions.

The aforementioned steps raise the data text c to the desired exponent d in a reduced number of computational operations, i.e. retrieved pre-stored instructions, so as to determine the integer representation m.

The method of the invention may further include the step of combining the bit information in the first and second memory elements to produce the integer representation m. This step allows the two memory elements to be utilised to generate the sequence of intermediate numbers while ensuring that a meaningful result is obtained for the integer representation m.

In a still further embodiment of the invention, executing a convergent sequence of operations on the first and second bit portions further includes halving the smaller magnitude bit portion if the larger magnitude bit portion is odd and the smaller magnitude bit portion is even and smaller than the larger magnitude bit portion by a predetermined factor.

Such a step increases the rate at which the convergent sequence of operations converges, and so results in fewer pre-stored instructions in the list of instructions. Fewer instructions means fewer intermediate numbers and so still quicker cryptographic transformation of the data text c.

Another embodiment of the method of the invention includes, after splitting the binary equivalent of the predetermined exponent into first and second bit portions, the step of adding m random bits to the least significant end of the first bit portion and adding m random bits to the most significant end of the second bit portion.

Adding m random bits to the least significant end of the first bit portion and adding m random bits to the most significant end of the second bit portion allows for the derivation of a different list of instructions each time a sequence of intermediate numbers is generated. This, in turn, results in different functional manipulations during each generation of the intermediate numbers while achieving the same result, i.e. generating the integer representation m.

The execution of different functional manipulations each time the sequence of intermediate numbers is generated increases the resistance of the decryption steps to side channel attack using, for example, Statistical Power Analysis (SPA).

In a still further method of the invention, executing a convergent sequence of operations on the first and second bit portions further includes:
  checking whether the first and second bit portions equal one another but are not equal to 1; and
  compensating for this equality if neither bit portion is equal to 1.

Preferably compensating for the equality includes subtracting a random number from one of the first or second bit portions.

The aforementioned steps ensure that the numbers in the first and second memory elements are only equal to one another when they equal 1.

According to a second aspect of the invention there is provided a semiconductor device configured to perform the method steps set out hereinabove.

The semiconductor device of the invention brings the aforementioned benefits associated with the method of the invention to the cryptographic transformation of data text when, e.g. recovering enciphered data from a smartcard or passport in which the device is embedded. As a result a user perceives less of a delay when data is recovered from such items than with conventional smartcards and passports.

There may be provided a computer program, which when run on a computer, causes the computer to perform any method disclosed herein or configure any apparatus, including a semiconductor device, disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples. The software may be an assembly program.

The computer program may be provided on a computer readable medium such as a disc or a memory device, or may be embodied as a transient signal. Such a transient signal may be a network download, including an internet download.

BRIEF DESCRIPTION OF THE DRAWINGS

There now follows a brief description of an embodiment of the method of the invention, by way of non-limiting example, with reference being made to the following figures in which.

Figure 1:
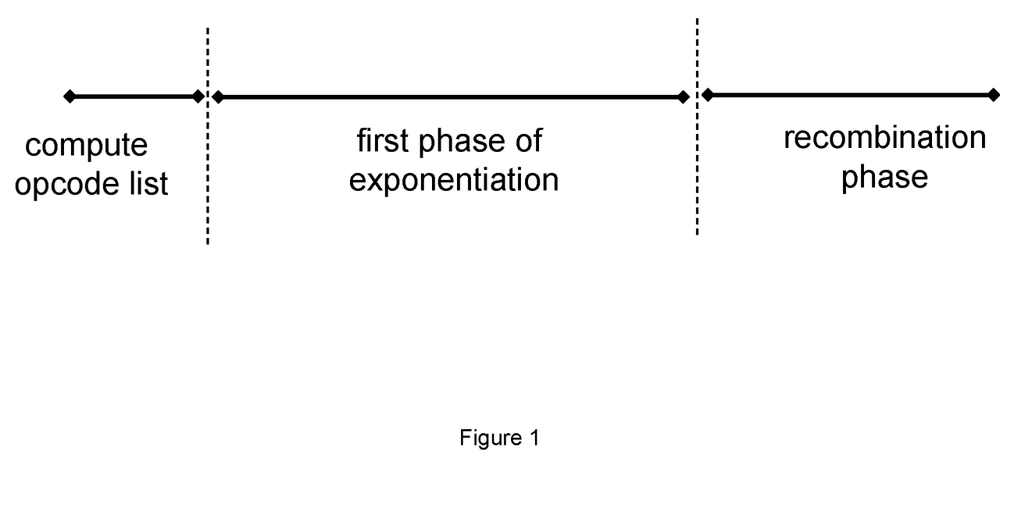
FIG. 1 shows a schematic overview of phases of a method of cryptographically transforming data text according to a method of the invention.

The phases of a method of cryptographically transforming a data text according to a method of the invention are illustrated schematically in FIG. 1.

More specifically, FIG. 1 illustrates three phases involved in calculating an integer representation m of the data text.

DETAILED DESCRIPTION OF EMBODIMENTS

A first phase includes the step of deriving and storing a list of instructions, i.e. "opcodes". Each instruction corresponds to the subsequent generation of a particular intermediate number.

In the method of the invention each instruction is derived from a predetermined exponent d.

In the illustrated method of the invention the data text is an encrypted cipher text c, and so a cryptographic decryption transformation is required. The predetermined exponent d is, therefore, a private decryption exponent.

In other methods of the invention (not illustrated) the predetermined exponent may be a public encryption exponent e, or other exponent.

Figure 2:
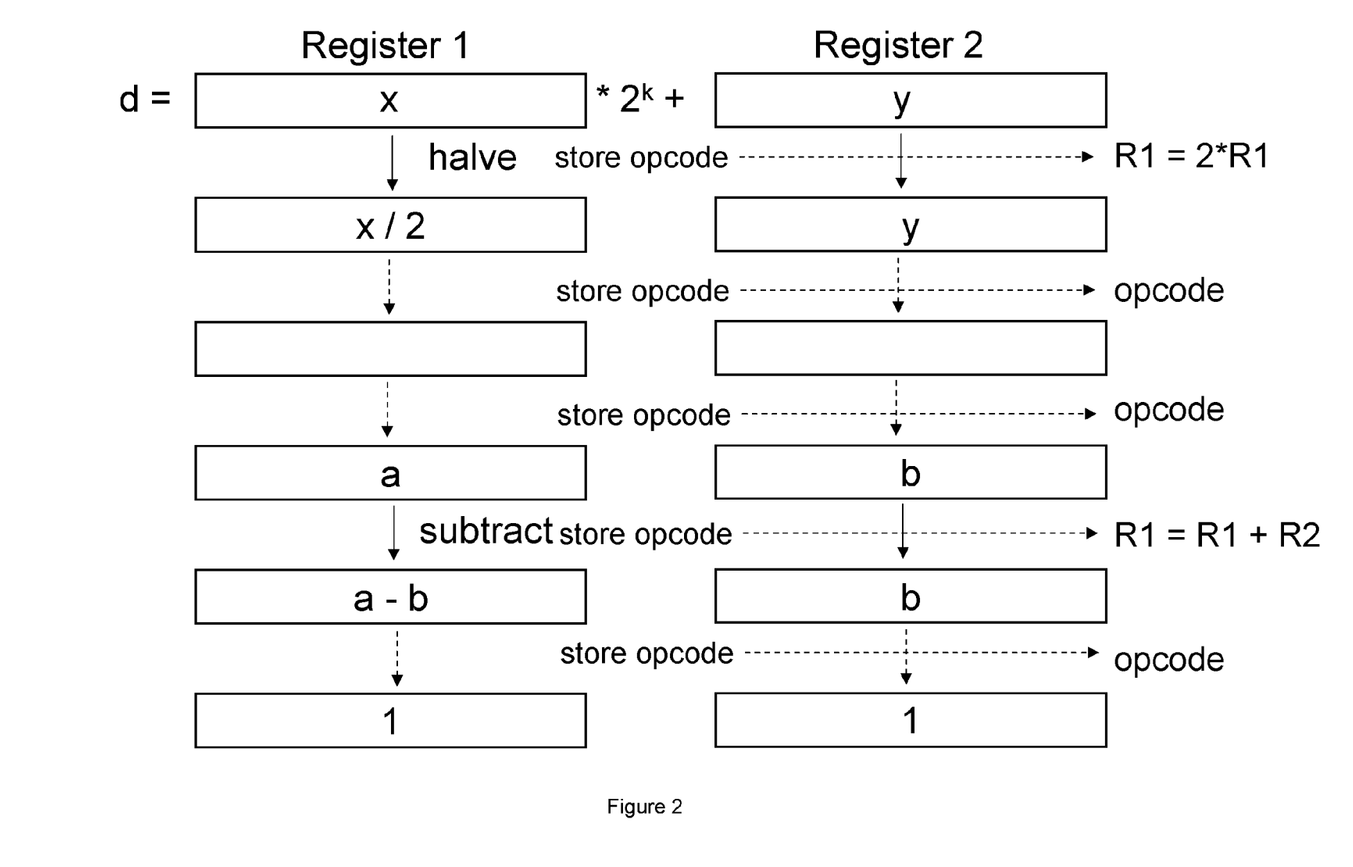
FIG. 2 shows a schematic representation of deriving a list of instructions according to the method illustrated in FIG. 1.

Deriving the instructions from the decryption exponent d is illustrated schematically in FIG. 2. The instructions are stored in a chronological sequence, i.e. in the order in which they are derived.

Such derivation includes splitting the binary equivalent of the decryption exponent d into a first bit portion x and a second bit portion y.

As shown in FIG. 2, the decryption exponent d is given by $$d = x*2^k + y$$

where k is the number of bits in each bit portion x, y.

The derivation of instructions also includes executing a convergent sequence of operations on the first and second bit portions x, y to reduce each bit portion to 1.

Executing a convergent sequence of operations includes identifying the bit portion x, y having the larger magnitude.

If the larger magnitude bit portion is even then the larger magnitude bit portion is halved, as illustrated in the transformation from x to x/2 shown in FIG. 2.

Halving the larger magnitude bit portion in this manner derives a double instruction which indicates the memory element, i.e. register R, in which the larger magnitude bit portion resides, i.e.

$$\text{Instruction}^1 : R1 = 2*R1$$

When such an instruction is retrieved it indicates that the bit portion in a first memory element, i.e. a first register R1, should be doubled and the result placed in the first register R1, as shown in the reverse transition from x/2 to x.

If the larger magnitude bit portion is odd then the smaller magnitude bit portion is subtracted from the larger magnitude bit portion, as illustrated in the transformation from a to a-b shown in FIG. 2.

Such an operation derives an add instruction which indicates the respective memory elements, i.e. registers, in which each of the larger magnitude bit portion and the smaller magnitude bit portion resides, i.e.

$$\text{Instruction}^n : R1 = R1 + R2$$

When such an instruction is retrieved it indicates that the bit portion in the first register R1 should be added to the bit portion in the second register R2 and the result placed in the first register R1.

Each of the halving or subtracting steps is repeated and a corresponding instruction stored until each bit portion x, y is 1.

A second phase in generating the integer representation m of the cipher text c includes generating a sequence of intermediate numbers.

Generating the sequence of intermediate numbers includes retrieving an instruction previously stored during the first phase. The said instructions are retrieved in a reverse-chronological sequence, i.e. in the opposite order in which they were derived.

Figure 3:
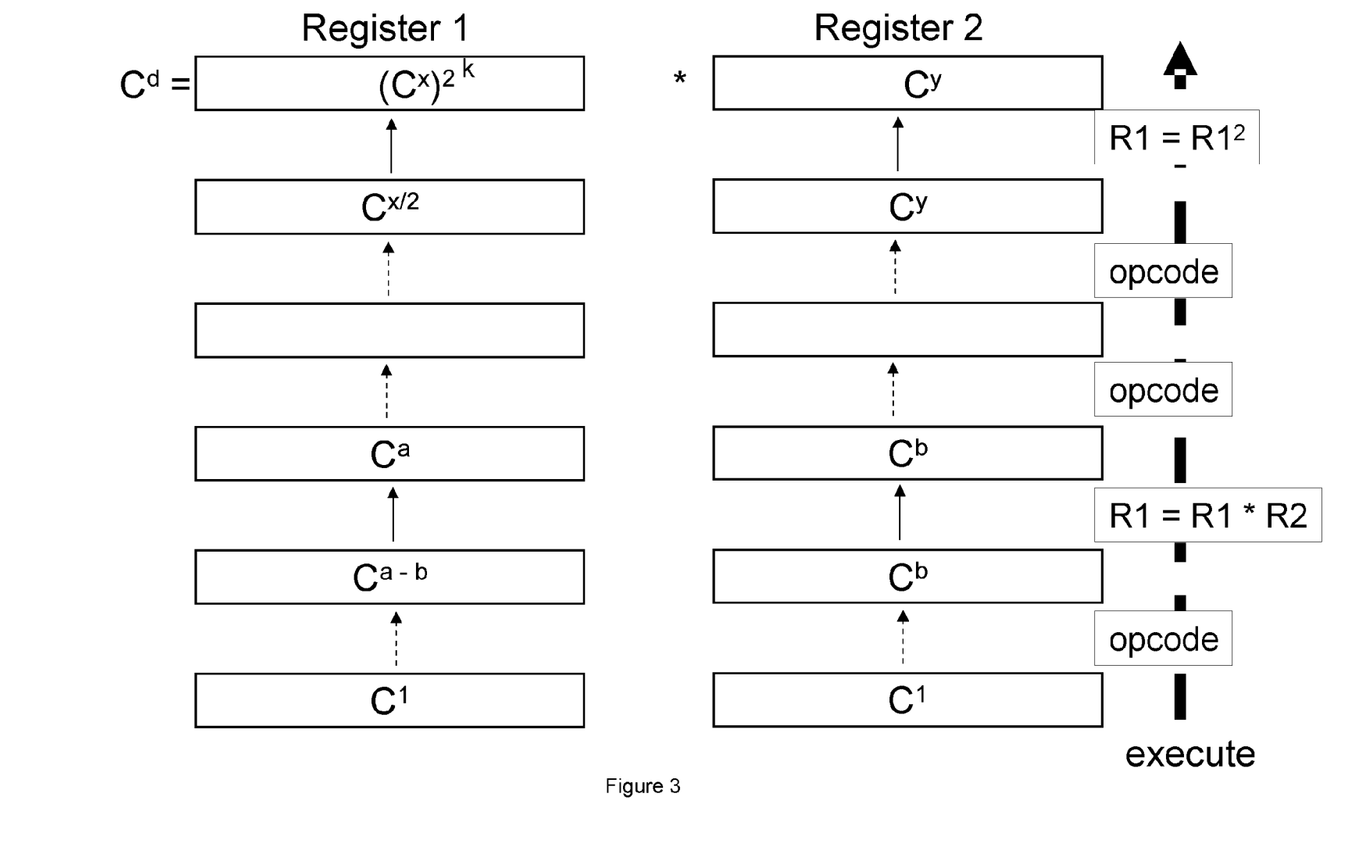
FIG. 3 shows a schematic representation of generating an integer representation m according to the method illustrated in FIG. 1.

The steps in generating the sequence of intermediate numbers are illustrated schematically in FIG. 3.

These steps include initialising first and second memory elements, i.e. first and second registers R1, R2, with the binary equivalent of the cipher text c.

As shown in FIG. 3, each binary representation of the cipher text c is raised to the exponent 1.

Accordingly, the exponent value in each of the first and second registers R1, R2 is equal to the value of the bit portions x, y in the first phase.

A pre-stored instruction is then retrieved and one or both of the first and second registers R1, R2 is functionally manipulated according to the retrieved instruction in order to generate an intermediate number.

A first pre-stored instruction may be an add instruction, as illustrated in the transformation from $c^{a-b}$ to $c^a$.

However, since the instruction relates to an addition within the exponent to which the cipher text c is raised, then the equivalent of adding exponents is to multiply the first and second registers R1, R2 together. Consequently the retrieved instruction is interpreted as $$\text{Instruction}^n : R1 = R1 * R2$$

to give $c^a$

The pre-stored instruction may also be a double instruction, as illustrated in the transformation from $c^{x/2}$ to $c^x$.

Similarly, the instruction relates to a doubling of the exponent to which the cipher text c is raised, and the equivalent of doubling an exponent is to square the corresponding register. As a result the retrieved instruction is interpreted as $$\text{Instruction}^1 : R1 = R1^2$$

to give $c^x$

The steps of retrieving a pre-stored instruction and functionally manipulating one or both of the first and second registers R1, R2 are repeated for each of the pre-stored instructions.

Accordingly, the first register R1 eventually contains $c^x$ and the second register R2 eventually contains $c^y$, as shown in FIG. 3.

Once this stage is reached the bit information in each of the registers R1, R2 is combined, in a third and final phase, according to $$c^d = (c^x)^{2k} * c^y$$

to give the integer representation m.

In particular, the integer representation m is produced by squaring the first register R1 k times, e.g. 512 times for a 512 bit long number, before multiplying the first register R1 by the second register R2.

It follows that by executing each of the pre-stored instructions, in a reverse-chronological order on first and second registers containing a binary representation of the cipher text c, it is possible to calculate the integer representation m.

In the case of RSA cryptography decryption it would now be possible to determined the original message M by reversing the agreed reversible protocol on the original data text m.

As illustrated in FIGS. 2 and 3, only two memory elements, i.e. first and second registers R1, R2, are required to derive the list of instructions and to execute the instructions to generate the desired sequence of intermediate numbers.

Such a memory requirement holds if inplace computation is possible in the calculating device, e.g. a semiconductor device or "chip".

Figure 4:
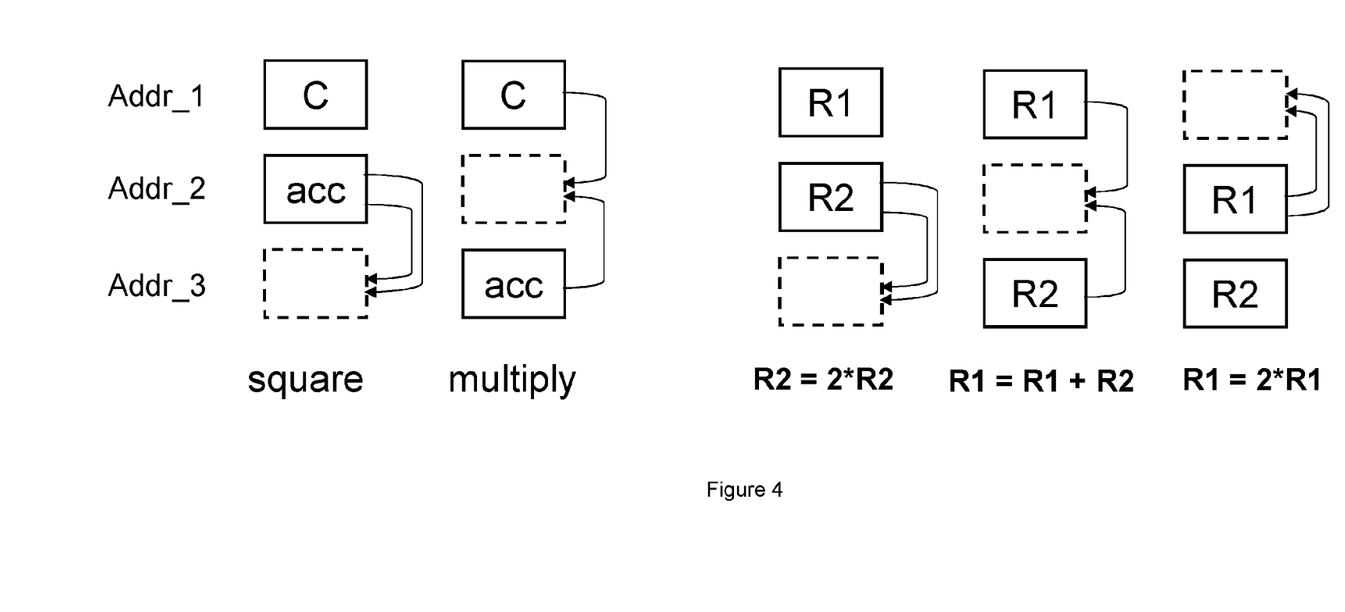
FIG. 4 shows the memory requirements of the method illustrated in FIG. 1.

When inplace computation is not possible a further, third memory element, i.e. a third register is required, as illustrated schematically in FIG. 4.

Nevertheless, in such circumstances conventional square-and-multiply modular exponentiation requires a further memory element, as also shown in FIG. 4.

Accordingly, the method of the invention is still able to maintain the low memory requirements of conventional square-and-multiply modular exponentiation in calculation devices in which inplace computation is not possible.

Moreover, the introduction of a third register in conjunction with the method of the invention provides for a greater degree of possible registers in which to place the result of a calculation, and so renders decryption according to the method of the invention even less susceptible to side channel attack by SPA.

Figure 5:
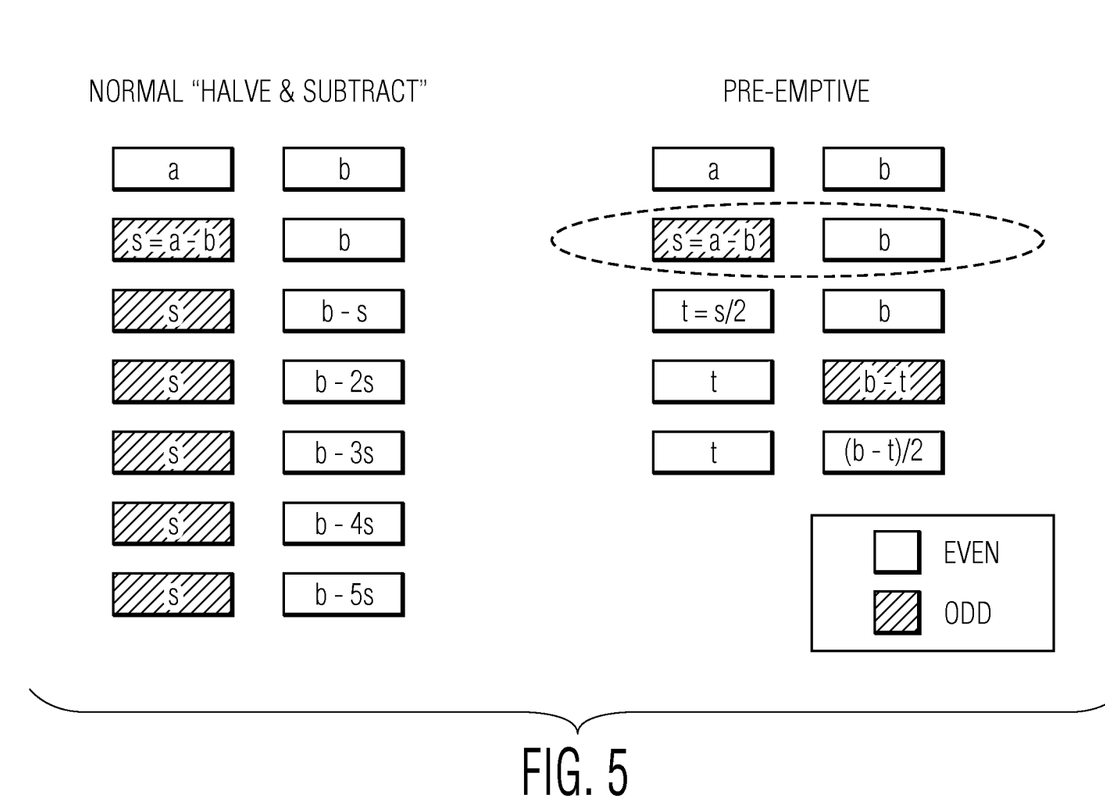
FIG. 5 shows a schematic representation of optional steps within the method illustrated in FIG. 1.

An optional procedure while executing a convergent sequence of operations on the first and second bit portions is illustrated schematically in FIG. 5.

The procedure includes "pre-emptive halving" of the register R1, R2 containing the smaller magnitude bit portion.

In particular, the procedure includes halving the smaller magnitude bit portion if the larger magnitude bit portion is odd and the smaller magnitude bit portion is even and smaller than the larger magnitude bit portion by a predetermined factor.

In an embodiment of the invention the predetermined factor is 8 or greater.

Statistical analysis indicates that the expected number of steps needed for an even value to become odd during such halving is two.

Accordingly, as illustrated in FIG. 5, halving the smaller magnitude bit portion, i.e. the transformation t=s/2, if the larger magnitude bit portion is odd and the smaller magnitude bit portion is even and smaller than the larger magnitude bit portion, reduces the number of steps required to converge the registers.

Figure 6:
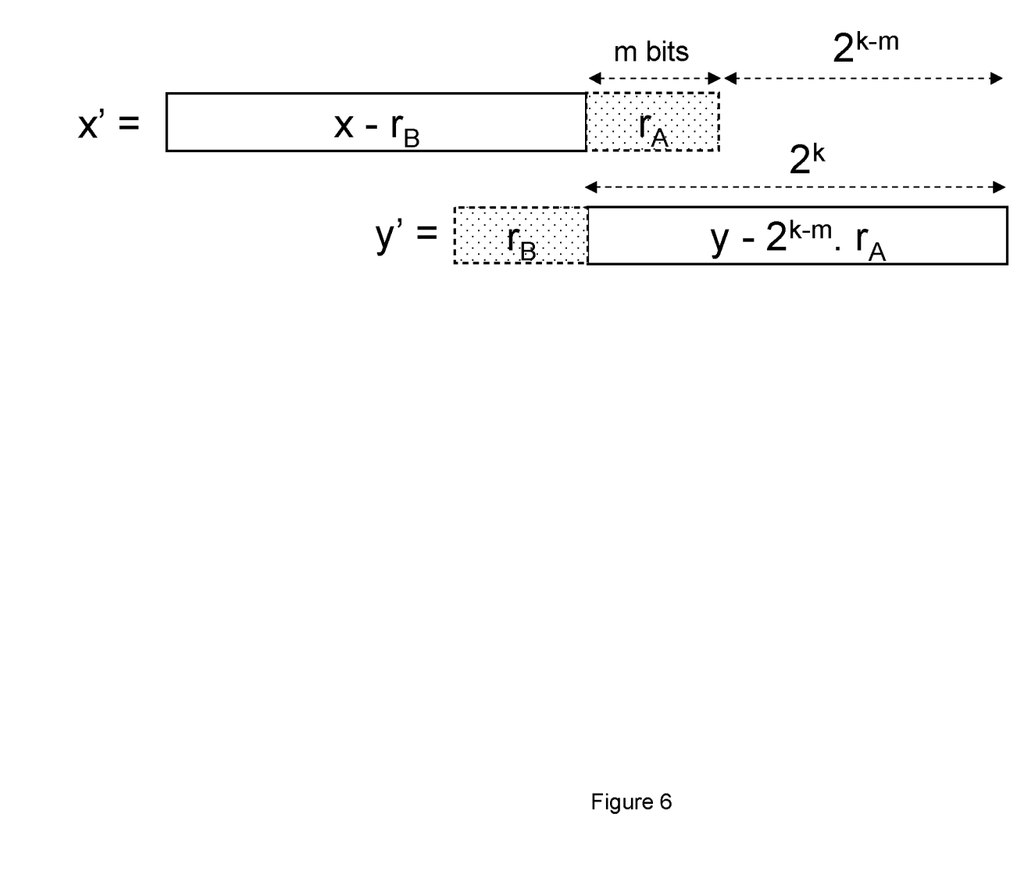
FIG. 6 shows a schematic representation of additional optional steps within the method illustrated in FIG. 1.

A further optional step in the method of the invention is illustrated schematically in FIG. 6.

The further optional step includes, after splitting the binary equivalent of the predetermined exponent d into first and second bit portions x, y, the step of adding m random bits to the least significant end of the first bit portion x to give x', and adding m random bits to the most significant end of the second bit portion y to give y'.

The derivation of instructions includes executing a convergent sequence of operations on the modified first and second bit portions x', y' in the same manner as described hereinabove.

Such inclusion of m random bits randomises the first derived instruction and propagates throughout all of the derived instructions.

Different random bits can be added each time the instructions are derived to ensure different functional manipulations during each generation of intermediate numbers, and so provide an effective defence to side channel attack by SPA.

The decryption exponent d is given by $$d = 2^{k-m} \cdot x' + y'$$

and so, as above, it is possible to calculate the integer representation m using $$m = c^d$$

by combining the first and second registers R1, R2 containing $c^{x'}$ and $c^{y'}$.

Figure 7:
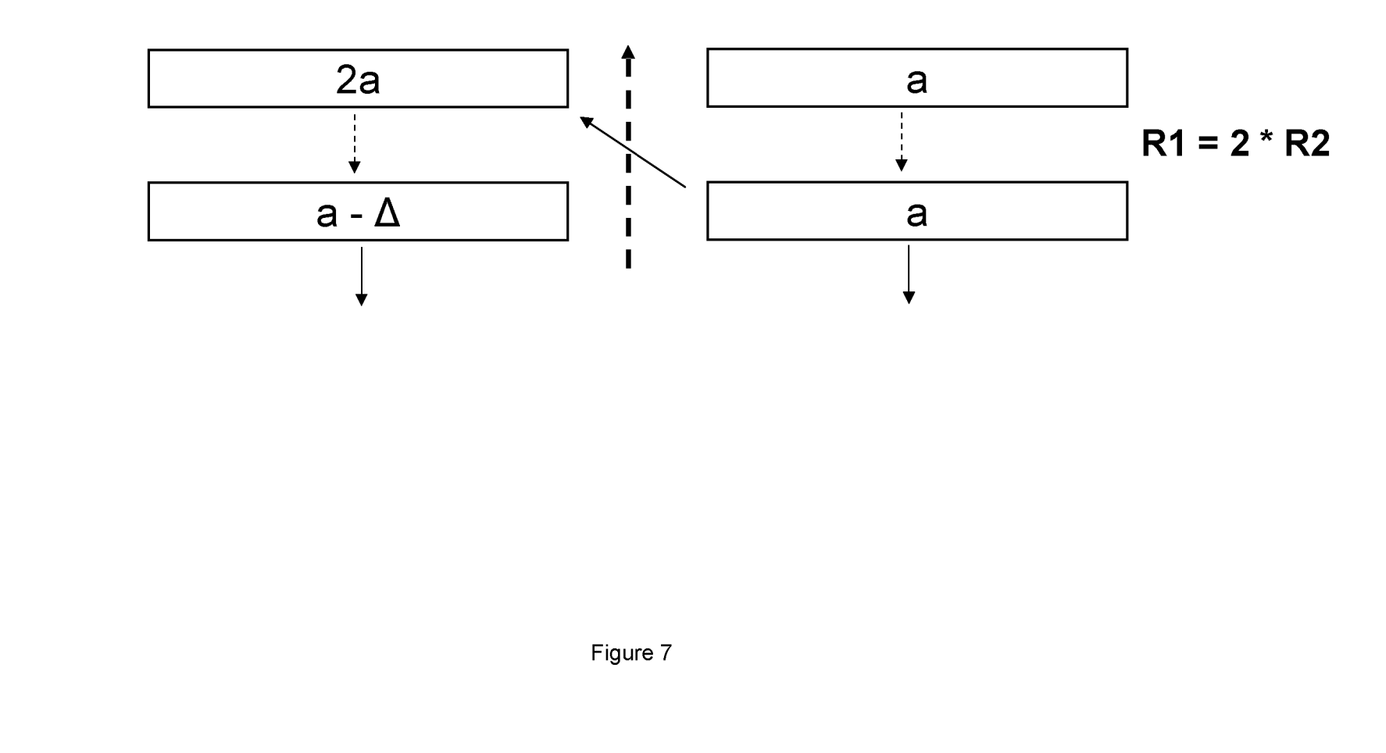
FIG. 7 shows a schematic representation of further desirable steps within the method illustrated in FIG. 1.

Preferably the method of the invention includes a further procedure which is illustrated schematically in FIG. 7.

The further procedure takes place while executing the convergent sequence of operations on the first and second bit portions and includes:
  checking whether the first and second bit portions equal one another but are not equal to 1; and
  compensating for this equality if neither bit portion is equal to 1.

Checking whether the first and second bit portions are equal to one another but are not equal to one may include checking whether one bit portion is exactly twice the other bit portion.

Compensating for the equality includes subtracting a random number A from of the first or second bit portions. In the illustrated embodiment the random number A is subtracted from the first register R1.

The steps described hereinabove may be employed in cryptographically transforming a plain text data text m to generate a cipher text c according to $$c = m^e$$

where the instructions are derived from a predetermined public encryption exponent e.

However, it should be noted that typically the encryption exponent e is shorter than the decryption exponent d and so any increase in the speed of calculating such a cipher text c (resulting from a reduction in the number of computational operations required) is less noticeable than in the corresponding decryption process.

The aforementioned steps may also be used to similarly cryptographically transform a data text m during a key agreement process, or when generating or verifying a digital signature.

The invention claimed is:

1. A method of cryptographically transforming data text c by a hardware processor comprising generating an integer representation m of the data text c according to $$m = c^d$$

where d is a predetermined exponent, the step of generating the integer representation m including generating a sequence of intermediate numbers, each intermediate number being based on two or fewer earlier numbers in the sequence, the generating a sequence of intermediate numbers including retrieving a pre-stored instruction to determine which two or fewer earlier numbers in the sequence a given intermediate number is based on and a functional manipulation of the two or fewer earlier numbers required to generate the given intermediate number;

wherein generating the integer representation m further includes deriving and storing a list of instructions, each instruction corresponding to the generation of a given intermediate number;

wherein deriving and storing a list of instructions includes deriving the instructions from the predetermined exponent d;

wherein deriving the instructions from the predetermined exponent includes:

splitting the binary equivalent of the predetermined exponent d into first and second bit portions;

executing a convergent sequence of operations on the first and second bit portions to reduce each bit portion to 1; and deriving an instruction at each step of the convergent sequence of operations, and wherein executing a convergent sequence of operations on the first and second bit portions includes:

identifying the bit portion having the larger magnitude;

halving the larger magnitude bit portion if the larger magnitude bit portion is even; and subtracting the smaller magnitude bit portion from the larger magnitude bit portion if the larger magnitude bit portion is odd; and repeating the identifying, halving and subtracting steps until each bit portion is 1.

2. A method according to claim 1 including storing the list of instructions in a first, chronological sequence and retrieving the list of instructions in a second, reverse-chronological sequence.

3. A method according to claim 1 wherein deriving an instruction at each step of the convergent sequence of operations includes:

deriving a double instruction when the larger magnitude bit portion is halved; and deriving an add instruction when the smaller magnitude bit portion is subtracted from the larger magnitude bit portion.

4. A method according to claim 3 wherein deriving a double instruction includes indicating a memory element in which the larger magnitude bit portion resides, and deriving an add instruction includes indicating respective memory elements in which each of the larger magnitude bit portion and the smaller magnitude bit portion resides.

5. A method according to claim 4 wherein generating a sequence of intermediate numbers further includes:

(a) initializing first and second memory elements with the binary equivalent of the data text c;

(b) retrieving a pre-stored instruction;

(c) functionally manipulating one or both of the first and second memory elements according to the retrieved instruction to generate an intermediate number; and (d) repeating each of steps (b) and (c) for each instruction in the list of instructions.

6. A method according to claim 5 further including combining the bit information in the first and second memory elements to produce the integer representation m.

7. A method according to claim 1 wherein executing a convergent sequence of operations on the first and second bit portions further includes halving the smaller magnitude bit portion if the larger magnitude bit portion is odd and the smaller magnitude bit portion is even and smaller than the larger magnitude bit portion by a predetermined factor.

8. A method according to claim 1 wherein executing a convergent sequence of operations on the first and second bit portions further includes:

checking whether the first and second bit portions equal one another but are not equal to 1; and compensating for the equality if neither bit portion is equal to 1.

9. A method according to claim 8 wherein compensating for the equality includes subtracting a random number from one of the first or second bit portions.

* * * * *